United States Patent

[11] 3,632,393

[72] Inventors Wassily Poppe;
 Habet M. Khelghatian, both of Delaware, Pa.
[21] Appl. No. 825,925
[22] Filed May 19, 1969
[45] Patented Jan. 4, 1972
[73] Assignee Avisum Corporation
 Philadelphia, Pa.

[54] COATED POLYOLEFIN ARTICLE
 7 Claims, No Drawings
[52] U.S. Cl. ..................................................... 117/72,
 117/77, 117/87, 117/138.8 E, 117/161 A, 260/3, 260/4
[51] Int. Cl. ..................................................... B32b 27/08, B32b 27/32
[50] Field of Search ............................................. 117/138.8 E, 161 A, 72, 77, 80, 76 F, 76 T; 161/243

[56] References Cited
UNITED STATES PATENTS

| | | | |
|---|---|---|---|
| 3,205,093 | 9/1965 | Lynch .......................... | 117/138.8 E |
| 3,228,791 | 1/1966 | Armour et al. ............... | 117/138.8 E |
| 3,380,938 | 4/1968 | Jack et al. .................... | 117/138.8 E X |

*Primary Examiner*—William D. Martin
*Assistant Examiner*—Ralph Husack
*Attorneys*—Roger V. N. Powelson, Arthur G. Gilkes, Charles E. Feeny and John C. Martin, Jr.

ABSTRACT: A coating composition capable of forming a film on a polyolefin substrate is provided from a solution of (a) a cyclized rubber, and (b) at least one material selected from the group consisting of styrene polymers, chlorinated polyolefins and polyketone resins. The composition is useful as a primer for subsequently applied decorative or protective topcoats such as enamels and lacquers.

COATED POLYOLEFIN ARTICLE

BACKGROUND OF THE INVENTION

This invention relates to a film-forming composition useful for coating shaped polyolefin articles and particularly to coating composition that may be used as a primer for various topcoats. The invention also relates to shaped polyolefin articles coated with the film-forming composition.

It is well known in the polymer art that unmodified polyolefins, particularly polymers containing substantial amounts of polypropylene, are relatively nonadherent to decorative and protective coatings such as paints, enamels, varnishes and lacquers. Various attempts have been made to alter the properties of polyolefins to improve the receptivity of polyolefin surfaces to coatings include modification of the surface by chemical and physical treatments. For instance, polyolefin articles may be immersed in an acidic etching bath or the polyolefin articles may be subjected to a mechanical treatment such s roughening of the polymer surface. Other known processes for inducing surface oxidation in order to improve adhesion include electrostatic treatment and flame treatment of a polyolefin surface. These and other processes increase the surface area to obtain improved adhesion of an applied coating to the polyolefin surface.

It is also known to improve adhesion of a topcoat to polyolefin surfaces by first applying an undercoat or primer. U.S. Pat. No. 3,205,093 describes certain polyolefin substrates coated with a composition consisting essentially of cyclized rubber. Although the described coating provides satisfactory undercoats for many topcoats, an undercoat consisting essentially of cyclized rubber is not particularly effective as a primer for commercially available acrylic lacquers.

Polyolefins have enjoyed significantly increased commercial useage in the preparation of films, molded articles, fibers, etc. due to their low cost and excellent properties. Coated polyolefin articles may be employed as substitutes for various construction materials, particularly heavier base materials. However, their normally poor receptivity to decorative and protective coatings has restricted development of polyolefins as shaped articles in commercial applications where such finishes are desired. A polyolefin article having a topcoat of a commercially available enamel or lacquer may be substituted, in many instances, for an equivalent metal part since tooling and finishing coats are reduced.

Polyolefins coated with decorative and protective finishes may be employed in a wide variety of industrial uses in he automotive, appliance, electronic, construction, and other industries.

SUMMARY OF THE INVENTION

It is an object of this invention to provide a film-forming composition useful for coating polyolefin substrates. Another object of this invention is to prepare coated polyolefin surfaces that will aid in providing adhesion of a total coating system to the polyolefin substrate and provide surfaces resistant to gentle abrasions such as rubbing and scraping. A still further object of this invention is to provide a polyolefin article having a satisfactory surface for the application of subsequent decorative and protective topcoatings such as paints, enamels, varnishes, lacquers and the like.

These and other objects of the invention are accomplished by applying to a polyolefin surface a film-forming coating composition comprising a solution of, as essential ingredients, (a) a cyclized rubber, and (b) at least one material selected from the group consisting of molecular weight styrene polymers, chlorinated polyolefins, and polyketone resins. The coating compositions of this invention are particularly effective as primers for polyolefin surfaces, especially when the topcoat is an acrylic lacquer.

DESCRIPTION OF THE INVENTION

In accordance with this invention, a solution of cyclized rubber and at least one of a low molecular weight styrene polymer, a chlorinated polyolefin or a polyketone resin in a volatile solvent is applied to the surface of the polyolefin article. The film-forming composition is then dried by air-drying or baking.

Polyolefins capable of being coated with the film-forming composition of this invention include solid, substantially crystalline polymers which contain a major proportion (i.e., greater than 50 percent) of an aliphatic olefin having from two to eight carbon atoms and particularly from three to six carbon atoms. Such polyolefins, therefore, include polyethylene, substantially crystalline polypropylene, ethylene propylene block or random copolymers, ethylene butene-1 block or random copolymers, polybutene-1, poly(4-methylpentene-1), poly(3-methylbutene-1), and the like. The term "polyolefin" as used herein is, furthermore, intended to include copolymers of hydrocarbon monomers with copolymerizable polar monomers in which such functional monomers constitute a minor proportion of the copolymer. Functional monomers frequently employed in combination with hydrocarbon monomers are in particular the acrylic monomers such as methyl methacrylate, ethyl acrylate, and acrylonitrile and the vinyl esters such as vinyl acetate. Particularly useful polyolefins are those that are substantially crystalline polymers derived from 1-alkenes having from three to eight carbon atoms, i.e., polymers containing at least 25 percent, and preferably at least 50 percent crystallinity as determined by density-crystallinity relationships, a type of technique described by J. A. Gailey et al., SPE Technical Papers (ANTEC), Vol. IX, Session IV-1, pages 1 to 4, Feb. 1963.

The cyclized rubber component of the film-forming composition is a well-known material and a commercially available article of commerce prepared by conventional methods such as treating a benzene solution of natural rubber with a metallic halide catalyst such as stannic chloride or titanium tetrachloride. A rubber isomer is formed which is considered to be a cyclized product. Specific details of its preparation are set forth in *The Paper Trade Journal*, Feb. 23, 1939, page 96, and *Rubber Age*, Apr. 1939. Additional technical information for preparing cyclized rubber may be found in U.S. Pat. Nos. 1,797,188; 1,846,247; 1,853,334 and 2,052,931.

The second essential component of the film-forming composition is a low molecular weight, compatible, solvent-soluble material such as a styrene polymer, a chlorinated polyolefin or a polyketone resin. Useful styrene polymers are low molecular weight, solvent-soluble thermoplastic polystyrenes having an approximate molecular weight, determined by intrinsic viscosity measurements, less than about 5,000 preferably from about 300 to about 3,000. The styrene polymers must be compatible with the other components of the film-forming composition.

Chlorinated polyolefins, also known as film-formers in paint formulations, may be obtained by chlorination of a polyolefin dissolved in an appropriate solvent and subsequent recovery of the product by precipitation. Useful polyolefins that may be chlorinated include polymers derived from 1-alkenes such as ethylene, propylene, etc. and mixtures thereof. Preferred chlorinated polyolefins useful in this invention are low molecular weight products generally having a molecular weight, as determined by intrinsic viscosity measurements, less than about 5,000 and preferably from about 500 to about 3,000.

Polyketone resins useful in this invention are known components in coating compositions. Ketones can be resinified either as a result of enolization and polymerization of the unsaturated isomer or the polymerization of an unsaturated ketone produced by the intermediate reaction with formaldehyde and subsequent dehydration. Typical are cyclohexanone resins, which are soluble varnish resins. Aliphatic ketones such as acetone and methyl ethyl ketone can be also condensed with formaldehyde to obtain polymerizable monomers. Other polyketones may be prepared by the copolymerization of an ethanoid monomer such as ethylene with carbon monoxide at about 100 to 1,000 atmospheres at a temperature of about 130°–140° C. in a suitable solvent with a peroxide catalyst such as t-butyl hydroperoxide. Such polyketones melt over a rather wide temperature range, depending on the ratio of ethylene to carbon monoxide. Various ethanoid monomers have been copolymerized with carbon monoxide to produce polyketones and such products, useful as additives in surface-coating compositions, are described in U.S. Pat. No. 2,495,286. The molecular weight of the polyketone resins, as determined by intrinsic viscosity, is less than about 5,000 and generally about 300 to bout 3,000.

Although the quantities of the various components are not considered critical, the following table of suggested proportions for vehicle formulations is presented. The quantities are by weight based on the total weight of the composition. The weight ratio of (a) to (b) can range from about 1:5 to 5:1.

TABLE I

| Component | Quantity |
| --- | --- |
| (a) a cyclized rubber | 2% to 30% |
| (b) combined weight of styrene polymers, chlorinated polyolefins and polyketone resins | 2% to 30% |
| (c) drier | 0.01% to 1.5% |
| (d) total solvent content | 60% to 92% |
| (e) other optional compatible resins | 0% to 35% |

Generally, the film-forming compositions described in this invention contain a drier to accelerate the conversion of the liquid coating composition to a dry film. Commercially available driers such as lead, cobalt or manganese linoleates, resinates, naphthenates, octoates and phthalates may be employed.

The film-forming composition is applied to a substrate as a solution and any of the aromatic solvents such as toluene, xylene, benzene, decahydronaphthalene, etc. or any other suitable solvent may be used.

Optional components of the coating composition include conventional pigments employed in the paint industry and conventional plasticizers such as the phthalates, sebacates, phosphates, tung oil and the like.

Additional optional ingredients of the coating composition include other compatible resins for coatings such as styrenated alkyds, alkyd resins, acrylic resins, polyesters, modified phenolic resins, alkyd-acrylate copolymers such as those described in U.S. Pat. No. 2,727,870 and the like.

Coating the composition on a substrate may be accomplished by conventional means such as brushing, spraying, knifing, dipping, roller coating and the like. When the coating is intended as a primer for a subsequently applied topcoat, very thin coatings ranging from about 0.05 to 0.2 mil may be applied. The thickness of the coating may vary with the intended use of the finished article. After application of the coating as a primer, subsequently applied topcoats include any of the commercially available decorative and protective finishes such as enamels, varnishes, lacquers and the like. A particular advantage of the film-forming composition of this invention is the ability of the applied coat to function as a primer and improve the adhesion of the total coating system to the polyolefin surface.

To evaluate the adherability of a coating to the surface of a shaped article such as a polyolefin surface, the following laboratory scale bench tests were devised:

In a first test, a ½ inch "Scotch Brand" paint-testing tape is applied to a small portion of the coated surface. Thereafter pressure is applied to the tape with a finger or other object so that the tape is firmly bonded to the painted surface. The tape is then stripped from the painted surface by an abrupt motion of the hand. If none of the coating is removed, as observed by the unaided eye, the adherency of the coating is rated as passing.

If the coated polyolefin composition passes the first test, a second test is conducted. In this test, a series of parallel lines about 1/16 inch apart are cut on the painted surface with a razor blade or similar cutting tool. Then another series of parallel lines spaced approximately 1/16 inch apart are cut at right angles to the first series thus forming a cross-hatched pattern. As in the first test, paint-testing tape is applied to the cross-hatched area and bonded firmly to the surface with pressure. Then the tape is abruptly stripped from the surface. If more than about 75 percent of the pain remains bonded to the polyolefin surface, the coating is rated passing and an additional test is performed.

This third test is conducted by cutting with a razor blade an elongated X on the surface of the polyolefin article that is approximately ½ in width and about 1 inch in length. The two straight lines forming the X are drawn to intersect at an angle of about 150°. Standard ½ inch "Scotch Brand" tape is applied to cover the X and about 3 additional inches of the coated surface. Again the tape is firmly grasped with two fingers and pulled sharply to free the tape in such a manner that the force exerted is as nearly as possible in the plane of the surface. The adhesion is rated according to the amount of coating removed from the surface. An excellent rating indicates essentially no peeling or slight peeling near the cut. Adhesion ratings of poor, fair, good and very good are determined by observation of the amount of peeling of the coating from the substrate.

For purposes of illustrating the invention, the following examples are provided wherein, unless otherwise indicated, all parts and percentages are by weight:

EXAMPLE 1

A solution is prepared by dissolving 33.35 parts of a cyclized rubber (available from Goodyear Tire and Rubber Co. as Pliolite NR) in 66.65 parts of xylene. Pliolite NR is a thermoplastic rubber derivative known as cyclized rubber and has a specific gravity of 1.05, a softening point range of 55°–65° C. and a refractive index of approximately 1.5. Another solution is prepared containing 8 parts of a polystyrene having an approximate molecular weight of 1,500, a ring and ball melting point of 100° C. and a specific gravity of 1.06; 4 parts of a polystyrene having an approximate molecular weight of 300, a ring and ball melting point of 5° C. and a specific gravity of 1.02; 3 parts of $TiO_2$; 14.6 parts of a finely divided talc; 0.2 parts carbon black; 10 parts of zinc oxide and 60 parts of xylene. The two solutions are mixed in equal amounts and the resulting solution is diluted by adding an equal amount of xylene.

Several 5 inch ×5 inch plaques were compression molded from a crystalline polypropylene having a low rate of 4.0 (ASTM–D–1238–62T) and containing as an additive system 0.2 percent of 2,6-ditertiarybutyl 4-methyl phenol, 0.2 percent of calcium stearate, 0.5 percent dilaurylthiodipropionate and 5 percent of $TiO_2$. The plaque was spray coated with the above-described coating composition. The coated sheet was dried by baking at 150° F. for 45 minutes. Thereafter the coating was rated for adhesion by the previously described tests and, after passing the first and second tests, a rating of very good was obtained in the third adhesion test.

EXAMPLE 2

Another solution was prepared by dissolving 15 parts of a polyketone resin (Polyketone resin 252, commercially available from Union Carbide Corporation), having a softening point of 165°–185° F., a specific gravity of 1.17–1.20 and a Gardner color (50 percent in methylethyl ketone) of 5 max.; 9.5 parts of the cyclized rubber defined in example 1 and 0.5 parts of a zinc resinate in 75 parts of xylene. This composition is applied as a primer by spray coating to two molded plaques of a crystalline propylene-ethylene terminal block copolymer having a flow rate of 4.0 and containing the same stabilizer and additive system as the polypropylene of example 1. After drying, the adhesion was evaluated by the same tests used in example 1. After passing the first and second adhesion tests, a rating of excellent was achieved on the third test.

A commercially available acrylic lacquer was applied as a topcoat to the second molded plaque. After baking the plaque to complete drying, the adherability of the topcoat was evaluated by the same adhesion tests. Again, excellent adhesion was obtained in the third adhesion test.

EXAMPLE 3

Another coating solution is prepared by dissolving 12.5 parts of the cyclized rubber described in example 1, 20 parts of a chlorinated polyolefin and 1 part of zinc resinate in 66.5 parts of xylene. The chlorinated polyolefin is commercially available as a solution from Eastman Chemical Products, Inc. as Chlorinated Polyolefin 515-2 and has a Brookfield viscosity (25° C.) at 40 percent solids in xylene of 80 cps. Physical properties of the chlorinated polyolefin resin are: a specific gravity of 1.04 to 1.09 and a Tukon hardness (ASTM-D-1474 -57T) of 2-4 knoops. The coating composition was applied to molded plaques of the polypropylene described in example 1 and after air drying, adhesion was evaluated and results equivalent to example 1 were obtained.

EXAMPLE 4

Example 3 is repeated using the same ingredients in the same proportions except that 10 parts of the chlorinated polyolefin was replaced with an equivalent amount of the polyketone resin described in example 2. This film-forming composition was coated on a plaque molded from the polypropylene described in example 1. After drying, the previously mentioned adhesion tests were performed and a rating of very good in the third adhesion test was obtained.

EXAMPLE 5

Example 1 was repeated with the exception that in the first solution the styrene polymers were 10 parts of polystyrene having a molecular weight of about 1,500 and 2 parts of a polystyrene having a molecular weight of about 350. The resulting xylene solution was coated onto a propylene-ethylene terminal block copolymer having a flow rate of 4.0 and containing the same additive system described in example 1. After the film-forming primer composition had dried, a topcoat of a blue paint containing a vinyl toluene-linseed oil alkyd resin as the vehicle was applied. The coating was evaluated for adhesion according to the previously described laboratory scale tests. The coatings easily passed the first two adhesion tests and received a good rating on the third test.

EXAMPLE 6 a. A solution was prepared by dissolving 8 parts of the cyclized rubber described in example 1, 17 parts of a polyketone resin (commercially available as Krumbhaar K-1717 from Krumbhaar Resin Division of Lawter Chemicals Inc.) having the following characteristics: a softening point of 144°-212° F., a specific gravity of 1.17 and an acid value of 1-2, and 0.5 parts of a zinc naphthenate solution containing 8% zinc in 74.5 parts of xylene.

A 5 inch ×5 inch plaque, compression molded from the crystalline polypropylene described in example 1 and containing the same additive system, was brush coated with the above-described film-forming composition. After the coating dried, a commercially available acrylic lacquer was sprayed on the primed polypropylene plaque. An adhesion rating of very good was obtained in the third adhesion test.

b. For purposes of comparison to demonstrate the effectiveness of the film-forming coating composition described in example 6a above as a primer for polypropylene, EXAMPLE 6a was repeated except that the polyketone resin was omitted and replaced with an equivalent amount of the cyclized rubber. A molded plaque of the same polypropylene was coated with the primer composition containing cyclized rubber as the sole resin. Then the same acrylic lacquer was applied as a topcoat by spraying. The coating failed the first adhesion test thus demonstrating the improved adhesion obtained by the addition of the polyketone resin.

EXAMPLE 7

A solution was prepared by dissolving in a mixed solvent of 75 parts of xylene and 5 parts of decahydronaphthalene the following ingredients: 3.94 parts of the chlorinated polyolefin described in example 3, 8 parts of the cyclized rubber described in example 1, 8 parts of the polyketone resin described in example 2 and 0.06 parts of cobalt naphthenate. A molded plaque of the polypropylene described in example 1 was coated with a primer composition and thereafter a topcoat of an acrylic lacquer was applied. Adhesion was evaluated and the first two adhesion tests were passed and a rating of good was obtained in the third adhesion test.

EXAMPLE 8

Another solution was prepared by dissolving the following ingredients in 80 parts of xylene: 3.94 parts of the chlorinated polyolefin described in example 3; 4 parts of the cyclized rubber described in example 1; 4 parts of the polyketone resin described in example 2; 8 parts of Amberlac 292X(48 percent solids in xylene), a commercially available alkyd-acrylate copolymer from Rohm & Haas Company prepared by reacting a mixture of styrene and methyl-methacrylate in equimolar quantities with a preformed alkyd resin of phthalic anhydride, glycerol and dehydrated castor oil; and 0.06 parts of cobalt naphthenate. As in example 7, a molded plaque of polypropylene was coated with a primer composition. Thereafter a topcoat of a commercially available acrylic lacquer was applied. Adhesion ratings similar to example 7 were obtained.

We claim:

1. As an article of manufacture, a solid polyolefin substrate having a surface thereof coated with a mixture of (a) a cyclized rubber, and (b) at least one low molecular weight, compatible, solvent-soluble material selected from the group consisting of thermoplastic polystyrenes, chlorinated polyolefins and polyketone resins, wherein the ratio of (a) to (b) ranges from about 1:5 to 5:1 by weight.

2. An article according to claim 1 wherein said polyolefin substrate is a propylene polymer.

3. An article according to claim 1 wherein said polyolefin substrate is a substantially crystalline polypropylene.

4. An article according to claim 1 wherein (i b) is a polyketone resin having a molecular weight of about 300 to about 3,000 as determined by intrinsic viscosity and said polyolefin substrate is polypropylene.

5. An article according to claim 1 wherein (b) is a polyketone resin, and an acrylic lacquer topcoat is applied over the coating mixture.

6. An article according to claim 1 wherein said polyolefin substrate is a propylene polymer and wherein (b) is a polyketone resin having a molecular weight less than about 5,000 as determined by intrinsic viscosity.

7. An article according to claim 1 wherein (b) is a polyketone resin.

* * * * *

PO-1050
(5/69)

UNITED STATES PATENT OFFICE
CERTIFICATE OF CORRECTION

Patent No. 3,632,393  Dated January 4, 1972

Inventor(s) Poppe, Wassily and Khelghatian, Habet M.

It is certified that error appears in the above-identified patent and that said Letters Patent are hereby corrected as shown below:

Column 1, line 15, after "improve" insert -- adhesion of subsequently applied coatings. The approaches attempted to improve --.
Line 20, "s" should read -- as --.
Line 45, "coats" should read -- costs --.
Line 47, "he" should read -- the --.
Line 66, before "molecular" insert -- low --.
Column 3, line 68, for "1/2" should read -- 3/4 --.
Column 4, line 11, for "pain" should read -- paint --.
Line 17, for "1/2" should read -- 3/4 --.
Line 47, after "black;" insert -- 0.2 parts of a finely-divided hydrated synthetic calcium silicate; --.
Line 52, for "low" should read -- flow --.
Column 6, line 54, for "(i b)" should read -- (b) --.

Signed and sealed this 22nd day of August 1972.

(SEAL)
Attest:

EDWARD M. FLETCHER, JR.
Attesting Officer

ROBERT GOTTSCHALK
Commissioner of Patents